M. G. HUBBARD.
Metallic Washer.

No. 162,386. Patented April 20, 1875.

Witnesses.
Alex Mahow
N. B. Smith

Inventor.
M. G. Hubbard
by A. M. Smith
Attorney

THE GRAPHIC CO.PHOTO-LITH.39 & 41 PARK PLACE,N.Y.

UNITED STATES PATENT OFFICE.

MOSES G. HUBBARD, OF MINNEAPOLIS, MINNESOTA.

IMPROVEMENT IN METALLIC WASHERS.

Specification forming part of Letters Patent No. 162,386, dated April 20, 1875; application filed May 22, 1874.

*To all whom it may concern:*

Be it known that I, MOSES G. HUBBARD, of the city of Minneapolis, county of Hennepin and State of Minnesota, have invented certain new and useful Improvements in the Form, Construction, and Arrangement of Elastic Washers, for preventing nuts from working loose on ordinary bolts; and that the following is a correct description thereof, reference being had to the accompanying drawing, which forms part of this specification.

Figure 1:
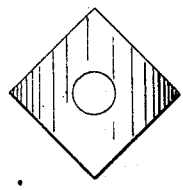
Figure 3:
Figure 2:
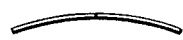
Figure 4:

Figure 1 is a top view of my elastic washer, showing its square form. Fig. 2 is an edge view, showing its curve in one direction only. Figs. 3 and 4 show different arrangements thereof.

My improvement consists in making an elastic washer, in the form and manner shown in Figs. 1 and 2, of sheet-steel, and then tempering it to give it sufficient elasticity and stiffness, and then arranging it as shown.

For many purposes the principal object of elastic washers would not be realized unless the elastic force or stiffness of the washers should be equal, or nearly equal, to the ordinary strain upon the bolts. By making these washers of sufficient thickness, or by placing a sufficient number of them on the same bolt, with their curves in the same direction, any desired amount of stiffness may be attained.

For many other purposes less stiffness and a greater range of spring are required. For such purpose, if their curves are placed in opposite directions alternately, any desired amount of elasticity or range of spring can be produced, as shown at E in Fig. 3.

I make my elastic washers square, because they can be sheared in that form out of sheet-steel, and also because in that form I get more elasticity and stiffness, with less liability to break, than in any other form. I curve them in one direction only, because I thereby attain the highest perfection of elasticity, being that which results from contracting one surface and expanding the other surface of the steel.

It will be observed that by making elastic washers square, and curving them in one direction only, I get nearly the action of a perfectly-proportioned tapered spring, thereby attaining the most favorable conditions for a successful tempered-steel elastic washer, viz., the greatest possible degree of elasticity, stiffness, strength, and cheapness attainable in an elastic washer.

Unless an elastic washer is constructed exactly right, it is a failure. It must be constructed in such way as to attain the greatest amount of stiffness and the greatest possible amount of elasticity by a given amount of expense for material and labor in manufacturing. These results have never been attained so perfectly as by the following method, viz: I take the best quality of spring-steel for tempering, and I shear it up into strips of the width desired, and then cut these strips into square washers, and punch the holes into them, of proper size for the bolts. I then curve these square washers in the peculiar form shown in Figs. 1 and 2, being in a line diagonally across the washer. I thus form a curved washer with the greatest possible stiffness in its center, and tapering down each way to a point. This gives a form of washer that will attain the greatest possible amount of elasticity — or, in other words, a spring of the best possible proportions.

My round elastic washers, for which I received Letters Patent February 11, 1873, could be easily curved by permitting them to slide in a trough indiscriminately into my curving-rollers; but my square washers are required to be curved diagonally across them, in order to give them as springs the peculiar tapering form required for perfect elasticity.

Figure 5:
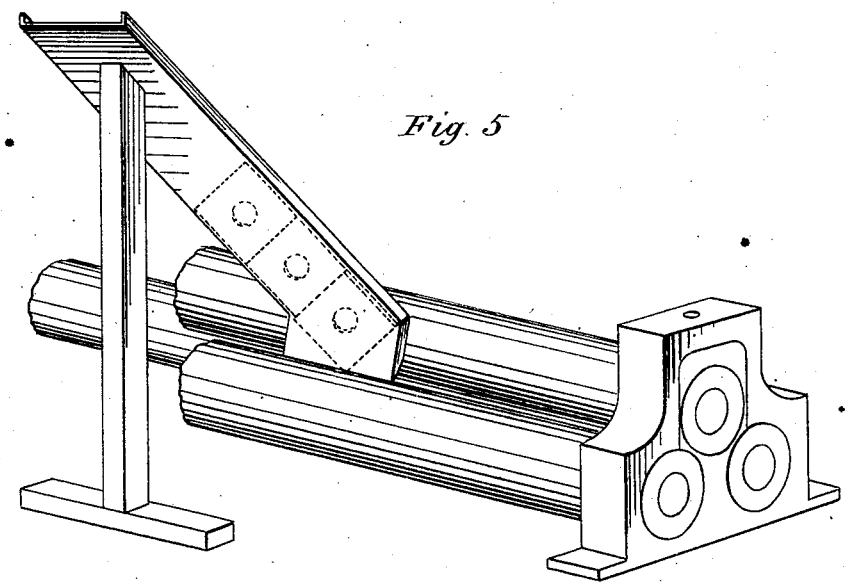

After much experiment I have found that by causing my square washer to slide into the rollers through a trough wide enough for one or more rows of them, and inclining said trough sidewise at an angle of forty-five (45) degrees from the rollers, as shown in Fig. 5, the washers will pass through the rollers diagonally in the right way to give the peculiar form required.

After giving my improved washers the proper form, I carefully temper them in an oil-bath, and they are ready for use.

I find that the proper temper greatly increases the stiffness, and therefore enables me to make them of much lighter steel than would otherwise be required, and the peculiar curve and form of my above-described washer enables me to give it the highest temper without incurring any unnecessary danger of breaking when used.

Having thus fully described my invention, what I claim as new, and desire to secure by Letters Patent, is—

A square elastic washer curved in one direction only, said curve extending diagonally across said washer, substantially as and for the purpose specified.

In testimony whereof I have hereunto set my hand this 8th day of May, A. D. 1874.

M. G. HUBBARD.

Witnesses:
BYRON P. DAGUE,
CHARLES L. TRAVIS.